Feb. 1, 1955 G. SCHÄFER 2,701,010
FLUID PRESSURE ACTUATED TIRE PRESSING DEVICE
Filed Nov. 8, 1951
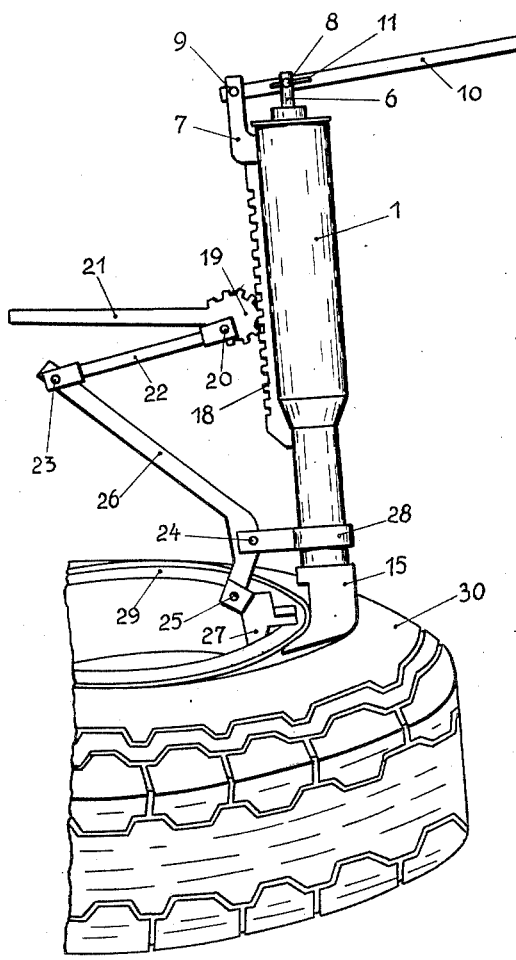
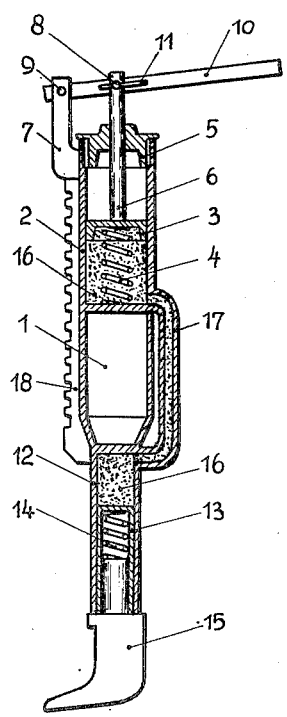
INVENTOR:
Georg Schäfer

United States Patent Office 2,701,010
Patented Feb. 1, 1955

2,701,010

FLUID PRESSURE ACTUATED TIRE PRESSING DEVICE

Georg Schäfer, Holzhausen-Reinhardswald, Germany

Application November 8, 1951, Serial No. 255,376

2 Claims. (Cl. 157—1.17)

This invention relates to a device for pressing tires off wheels.

One object of the invention is to provide an improved device which permits a tire to be very simply and conveniently pressed off a wheel, for example a heavy automobile pneumatic tire.

According to the invention a device for pressing tires off wheels is provided with the combination of a body, a gripping claw movably secured to said body and capable of being brought into engagement with a wheel rim, a pressing claw movably mounted in said body, and means for forcing said pressing claw to move outwardly in said body, the arrangement being such that when said gripping claw is engaged with the rim of a wheel said pressing claw can be moved outwardly in said body to force a tire off the wheel. Further features of the invention can be seen from the following description read in conjunction with the following claims.

In the accompanying drawing a device according to the invention is illustrated by way of example, Figure 1 being a side view of the device in operation, and Figure 2 a sectional elevation of a detail.

Referring to the said drawing, the device comprises a tubular body 1 in the upper part of which is a main hydraulic cylinder 2 in which a piston 3 moves, there being a spring 4 located below the piston 3 and a piston rod 6 secured to the piston 3. Secured to the upper part of the body is a lug 7 to which a pressure lever 10 is connected by a pivot joint 9, the lever 10 having a slot 11 into which projects the pivot pin of a pivot joint 8. A sleeve 5 is arranged at the top of the cylinder 2.

In the lower part of the body is a working cylinder 12 containing a piston 13 and return spring 14, and at the lower end of the working cylinder is arranged a pressing claw 15. The cylinder 2 and the cylinder 12 are interconnected by a connecting pipe 17 through which passes hydraulic fluid or oil 16. A toothed rack 18 is rigidly secured to the exterior of the body 1. By means of a hand lever 21 a toothed pinion 19, which is eccentrically mounted at the bearing point 20, can be vertically adjusted on the rack 18. The toothed pinion 19 is connected through a link 22 and a crank lever 26 with pivot joints 23, 24 and 25 to a gripping claw 27. The crank lever 26 is connected intermediate its ends by the pivot joint 24 to a clamp 28 which is secured to the body 1. In Figure 1 the device is shown applied to a wheel having a rim 29 on which is a tire 30.

The device operates as follows:

Firstly, the whole device is arranged on the bulge of the tire 30 with a slight inclination towards the rim 29. Next the gripping claw 27 is engaged with the rim 29 by means of the link 22 and lever 26 and by turning the hand lever 21 downwards the pinion 19 is pressed eccentrically on the toothed rack 18. The whole device is now securely attached to the wheel rim 29.

With a light pressure of the lever 10 on the piston 3 in the main cylinder 2 the oil in the latter is forced through the connecting pipe 17 into the working cylinder 12. The oil presses the piston 13 in the vertical direction through the return spring 14 on to the pressure claw 15, and the latter now presses on the bulge of the tire 30 and presses the same downwards on the wheel rim.

The free space in the bulge is now pressed on the wheel rim and held firmly there.

The device must now be pressed somewhat further on the rim in order to repeat the same procedure.

If for this purpose the lever 10 is released, the oil pressure in the cylinder 12 is released through the counter-pressure of the return spring 14 and the oil flows back through the pipe 17 into the main cylinder 2. Simultaneously the hand lever 21 is knocked downwards and the crank lever 26 releases the gripping claw 27 from the wheel rim 29. The device is free for a new insertion. The procedure is repeated in the described sequence until the tire edge is pulled completely over the rim of the wheel.

I claim:

1. In a fluid pressure actuated tire pressing device, comprising a body, a fluid pressure cylinder in said body, a piston slidably arranged in said body and actuated by fluid pressure in said cylinder, and a pressing claw slidably guided in said body and capable of being forced downwardly by said piston, the provision of a crank lever pivotally secured intermediate its ends to said body, a gripping claw attached to the lower end of said crank lever, a link having one end pivotally secured to the upper end of said crank lever, a toothed pinion eccentrically pivoted to the other end of said link, a hand lever rigidly secured to said pinion, and a toothed rack rigidly secured to said body for meshing engagement by said pinion, the arrangement being such that upward manual pressure on said hand lever rotates said pinion to urge said body downwards and through said link and said crank lever urges said gripping claw towards said pressing claw.

2. In a fluid pressure actuated tire pressing device comprising a body in the form of a fluid pressure cylinder, and a pressing claw slidably guided in said body to be forced downwards by the action of fluid pressure, the provision of a crank lever pivotally secured intermediate its ends to said body, a gripping claw attached to the lower end of said crank lever, a link having one end pivotally secured to the upper end of said crank lever, a toothed pinion eccentrically pivoted to the other end of said link, a hand lever rigidly secured to said pinion, and a toothed rack rigidly secured to said body for meshing engagement by said pinion, the arrangement being such that upward manual pressure on said hand lever rotates said pinion to urge said body downwards and through said link and said crank lever urges said gripping claw towards said pressing claw.

References Cited in the file of this patent

UNITED STATES PATENTS

| Number | Name | Date |
|---|---|---|
| 416,500 | Robbins | Dec. 3, 1889 |
| 1,519,558 | Snider | Dec. 16, 1924 |
| 2,314,127 | Colley et al. | Mar. 16, 1943 |
| 2,495,117 | McCollister | Jan. 17, 1950 |
| 2,520,330 | Northrup et al. | Aug. 29, 1950 |
| 2,563,987 | Colley | Aug. 14, 1951 |
| 2,581,086 | Edenfield et al. | Jan. 1, 1952 |
| 2,606,602 | Manupello | Aug. 12, 1952 |